United States Patent Office 3,114,758
Patented Dec. 17, 1963

3,114,758
PROCESS FOR PRODUCING 10-FLUOROPHEN-
ARSAZINE COMPOUNDS
Ikuzo Kageyama, Toyonaka City, and Nagaoki Miyamura, Osaka City, Japan, assignors to Osaka Kinzoku Kogyo Company, Limited, Osaka City, Japan
No Drawing. Filed Dec. 4, 1961, Ser. No. 157,013
3 Claims. (Cl. 260—440)

This invention relates to the production of 10-fluorophenarsazine compounds.

More particularly, the invention pertains to the method of producing 10-fluorophenarsazine compounds which comprises reacting a phenarsazine-10-oxide having the general formula:

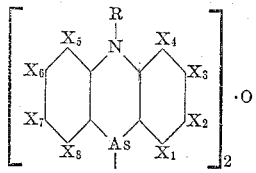

wherein R is a hydrogen atom, an alkyl group or an acyl group, and $X_1$ to $X_8$ respectively stand for a hydrogen atom, a halogen atom, a hydroxyl group, an alkyl group, a halogenated alkyl group, an alkyloxyl group, a carboxyl group or a nitro group, with fluorosilicic acid of fluoroboric acid at a temperature ranging from room temperature to the boiling point of the reactant, so as to produce the desired compound of this invention having the structural formula:

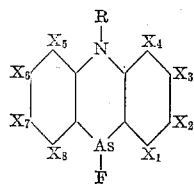

wherein R and $X_1$ to $X_8$ are as defined hereinbefore.

The preferred examples of the 10-fluorophenarsazine compounds of this invention having the above-stated structural formula are:

| | | M.P. in °C. |
|---|---|---|
| 5-hydro-10-fluorophenarsazine. | (NH, As, F ring structure) | 273 |
| 3-hydroxy-5-hydro-10-fluorophenarsazine. | (structure with OH) | 261–265 |
| 2-methyl-5-hydro-10-fluorophenarsazine. | (structure with CH₃) | 241–243 |
| 2-methoxy-5-hydro-10-fluorophenarsazine. | (structure with OCH₃) | 240–242 |
| 3,7-dichloro-5-hydro-10-fluorophenarsazine. | (structure with Cl, Cl) | 263–265 |
| 2-nitro-5-hydro-10-fluorophenarsazine. | (structure with NO₂) | 268 |
| 5-methyl-10-fluorophenarsazine. | (structure with CH₃ on N) | 305 |
| 4-carboxy-5-hydro-10-fluorophenarsazine. | (structure with COOH) | 299–300 |
| 2-trifluoromethyl-4-nitro-5-hydro-10-fluorophenarsazine. | (structure with NO₂, CF₃) | 273–274 |
| 2-fluoro-5-hydro-10-fluorophenarsazine. | (structure with F) | 282–283 |

In the prior art, the 10-halogenophenarsazine compounds are produced by condensing with heat diphenylamine or a derivative thereof having the structural formula:

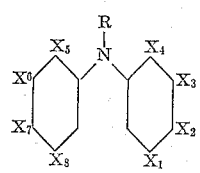

wherein R and $X_1$ to $X_3$ are as defined hereinbefore, with an approximately equimolar arsenic trihalide; or by reacting a 10-halogenophenarsazine compound with a metal halide for double decomposition. These methods however cannot be applied to the production of the 10-fluorophenarsazine compounds of this invention, because the reactivity of the fluorine atom is entirely different from that of other halogen atoms.

According to the method of this invention, a 10-chloro-, 10-bromo- or 10-iodophenarsazine compound or a derivative thereof is hydrolyzed with an alkaline solution, and the resulting phenarsazine-10-oxide is reacted with an aqueous solution of fluorosilicic acid or fluoroboric acid at a temperature ranging from room temperature to the boiling point of the reactant, yielding the desired 10-fluorophenarsazine compound. The reactant fluorosilicic acid or fluoroboric acid can be employed by dissolving in an organic solvent such as acetone and other lower alcohols. But glacial acetic acid is not a preferable solvent, because the reaction produces a molecular compound containing 3 molecules of 10-phenarsazine and 1 molecule of acetic acid.

In the aforesaid method, the phenarsazine-10-oxide quickly turns into the desired 10-fluorophenarsazine compound by the action of the reactant, and the reaction takes place almost quantitatively as the desired final product is water-insoluble and precipitates in the solution. The reaction is accordingly performed in a very simple and easy manner.

To exemplify the practice of this invention, the reaction of 5-hydrophenarsazine-10-oxide with fluorosilicic acid is performed in the following manner:

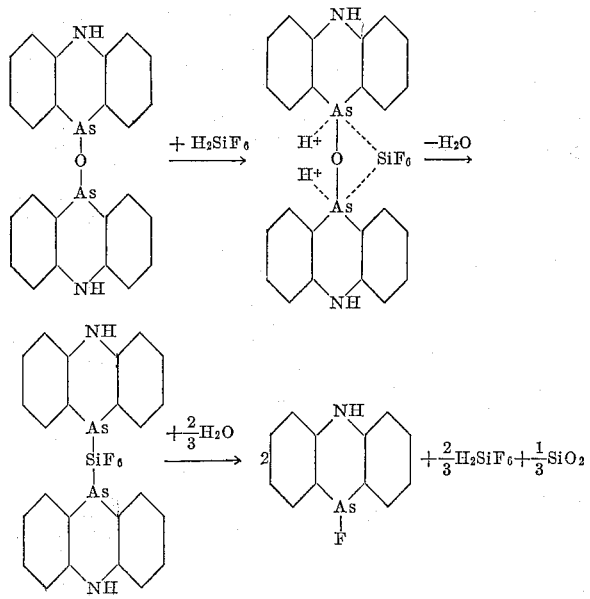

An identical reaction takes place with fluoroboric acid, yielding fluoroboric acid and boric acid besides the desired 10-fluorophenarsazine compound. The highest yield is obtained when the reactant is dissolved in aqueous medium in the order of about 50 weight percent concentration.

When the reaction of this invention with fluorosilicic acid is performed in the presence of hydrofluoric acid, the precipitating silicon dioxide is dissolved by the action of the hydrogen fluoride to produce fluorosilicic acid. Likewise, the reaction with fluoroboric acid performed in the presence of hydrofluoric acid produces fluoroboric acid by the action of the hydrogen fluoride. Thus the reaction of this invention is performed with much profit and the product is separated in a very easy and simple manner.

The 10-fluorophenarsazine compounds of this invention are obtained in the state of fine particles, and do not dissolve in water and ordinary solvents, except in dimethylformamide, dimethylsulfoxide, dimethylacetamide, tetrahydrofuran and dioxane. The solubility in dimethylformamide is about 1.5 percent at room temperature and about 10 percent at 100° C., whereas the solubility in other solvents specified above is confined to 1 percent or thereabout even when heated.

The products of this invention are hardly subjected to hydrolysis and chemically stable, so that the products can be stored for a long period of time even under high humidity.

In the prior art, the oxygen atom of an organic compound is replaced with a fluorine atom by the action of fluoride such as HF and $SF_4$. One of the specific features of this invention, however, is to replace the oxygen atom of phenarsazine-10-oxide with a fluorine atom by the action of an inorganic acid containing a fluorine atom in its structure, i.e. fluorosilicic acid or fluoroboric acid, other than hydrofluoric acid. Such a reaction is entirely novel in the art, and the mechanism thereof is believed to have been sufficiently disclosed in the foregoing.

Phenarsazine-10-oxide does not produce phenarsazine-10-fluoride when reacted with hydrofluoric acid containing neither silicon nor boron. If such reaction takes place, it is believed that fluorosilicic acid or fluoroboric acid is produced in the reaction mixture by the silicon or boron either contained in the reaction mixture as an impure substance or dissolving out into the reaction mixture from the reaction vessel. It is therefore claimed that the reaction of phenarsazine-10-oxide with hydrofluoric acid yielding a 10-fluorophenarsazine compound by the action of silicon or boron eventually contained in the reaction mixture even in the slightest amount be included in the scope of this invention.

Preferred examples are as follows, wherein all parts are by weight:

*Example 1*

To 2.04 parts of diphenylamine are added 2 parts of orthodichlorobenzene in the presence of 2.4 parts of arsenic trichloride. The mixture is heated with stirring to boil in a glass flask equipped with a reflux condenser, and cooled, yielding 3.3 parts of 5-hydro-10-chlorophenarsazine. 4 parts of 10 N solution of sodium hydroxide are added. The precipitating 5-hydrophenarsazine-10-oxide is collected by filtration, washed with water and dried.

To 50 grams of said 5-hydrophenarsazine-10-oxide placed in a polyethylene beaker are added 130 grams of 50 percent aqueous solution of fluorosilicic acid. The mixture is agitated with stirring at 30° C. for about 1 hour. Precipitates are collected by filtration, washed with water and dried. Dimethylformamide is then added, and the resultant solution is filtered and evaporated, yielding the desired 5-hydro-10-fluorophenarsazine of this invention. Yield is 94.5% of theoretical. Analysis for F shows 7.26% as against theoretical 7.28%.

*Example 2*

250 grams (0.5 mol) of 5-hydrophenarsazine-10-oxide are suspended in 3.5 liters of acetone and refluxed slowly on water bath. 100 cc. of 50 percent aqueous solution of fluorosilicic acid diluted in 500 cc. of acetone are added dropwise. The mixture is heated for a further period of 30 minutes. The content turns gradually orange-yellow. Precipitates are collected by filtration, washed with water and dried, yield 240 grams (0.9 mol) of the desired 5-hydro-10-fluorophenarsazine. Yield is 92% of theoretical.

*Example 3*

50 grams of 5-hydrophenarsazine-10-oxide are reacted with 130 grams of 50 percent aqueous solution of fluoroboric acid for 10 hours in a manner as described in Example 1. Dimethylformamide is added. After filtration to separate boric acid, the solution is evaporated. Yield of the resultant 5-hydro-10-fluorophenarsazine is 96% of theoretical.

*Example 4*

50 grams of 5-hydrophenarsazine-10-oxide are reacted in a manner as described in Example 1 with a mixture containing 50 grams of 50 percent aqueous solution of fluorosilicic acid and 50 grams of 50 percent aqueous solution of fluoroboric acid. Dimethylformamide is added to separate silicon dioxide and boric acid. The solvent is removed by evaporation. The yield of the resultant 10-fluorophenarsazine compound is 96.4% of theoretical.

*Example 5*

To 500 grams (1 mol) of 5-hydrophenarsazine-10-oxide placed in a 3-liter stainless steel vessel equipped with an agitator and a reflux condenser are added 1,000 grams of 30 percent aqueous solution of fluorosilicic acid containing 10 weight percent of hydrofluoric acid. The mixture is heated with agitation at 70° C. for 2 hours. Precipitates are collected by filtration, washed with water and dried, yielding in the state of fine particles 496 grams of pure phenarsazine fluoride containing no silicic acid anhydride. Yield is 95% of theoretical.

*Example 6*

To 536 grams (1 mol) of 2-fluoro-5-hydrophenarsazine-10-oxide charged in an identical vessel as employed in Example 5 are added 1,000 grams of 30 percent aqueous solution of fluoroboric acid containing 20 weight percent of hydrofluoric acid. The mixture is heated to react at 80° C. for 5 hours and cooled. Precipitates are collected by filtration, washed with water and dried, yielding in the state of fine particles 532 grams (1.9 mol) of 2,10-difluoro-5-hydrophenarsazine. The product is pure, containing no boric acid. Yield is 95% of theoretical.

What we claim is:

1. Process for producing 10-fluorophenarsazine compounds comprising reacting a phenarsazine-10-oxide having the structural formula:

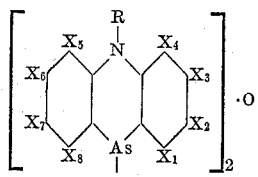

wherein R is a member selected from the group consisting of hydrogen and lower alkyl, and $X_1$ to $X_8$ respectively stand for a member selected from the group consisting of hydrogen, chlorine and fluorine atoms and OH, lower alkyl, trifluoromethyl, lower alkoxy, COOH and $NO_2$ groups, with a solution containing a member selected from the group consisting of fluorosilicic acid and fluoroboric acid.

2. Process according to claim 1, wherein the said solution also contains hydrofluoric acid.

3. Process for the production of 5-hydro-10-fluorophenarsazine which comprises reacting 5-hydrophenarsazine-10-oxide with an aqueous solution of fluorosilicic acid.

4. Process for the production of 5-hydro-10-fluorophenarsazine which comprises reacting 5-hydrophenarsazine-10-oxide with an acetone solution of fluorosilicic acid.

5. Process for the production of 5-hydro-10-fluorophenarsazine which comprises reacting 5-hydrophenarsazine-10-oxide with an aqueous solution of fluoroboric acid.

6. Process for the production of 5-hydro-10-fluorophenarsazine which comprises reacting 5-hydrophensarsazine-10-oxide with an aqueous solution of fluorosilicic and fluoroboric acid.

7. Process for the production of 5-hydro-10-fluorophenarsazine which comprises reacting 5-hydrophenarsazine-10-oxide with an aqueous solution of fluorosilicic and hydrofluoric acid.

8. Process for the production of 2,10-difluoro-5-hydrophenarsazine which comprises reacting 2-fluoro-5-hydrophenarsazine-10-oxide with an aqueous solution of fluoroboric and hydrofluoric acid.

No references cited.